(12) United States Patent
Seikel et al.

(10) Patent No.: US 9,233,494 B2
(45) Date of Patent: Jan. 12, 2016

(54) INJECTION MOLD AND INJECTION-MOLDED PART

(71) Applicant: PAS Deutschland GmbH, Neuruppin (DE)

(72) Inventors: Michael Seikel, Berlin (DE); Robert Schulze, Berlin (DE)

(73) Assignee: PAS Deutschland GmbH, Neuruppin (DE)

( * ) Notice: Subject to any disclaimer, the term of this patent is extended or adjusted under 35 U.S.C. 154(b) by 105 days.

(21) Appl. No.: 14/081,107

(22) Filed: Nov. 15, 2013

(65) Prior Publication Data

US 2014/0141196 A1 May 22, 2014

(30) Foreign Application Priority Data

Nov. 20, 2012 (DE) .................... 20 2012 104 499 U
Jul. 15, 2013 (DE) ........................ 10 2013 107 468

(51) Int. Cl.
*B29C 45/00* (2006.01)
*B29C 33/00* (2006.01)

(52) U.S. Cl.
CPC ......... *B29C 45/0046* (2013.01); *B29C 33/0077* (2013.01); *B29C 45/0025* (2013.01); *B29C 2045/0027* (2013.01); *Y10T 428/24174* (2015.01)

(58) Field of Classification Search
CPC ................... Y10T 428/24174; B29C 45/0046; B29C 33/0077; B29C 2045/0027
USPC ..................................................... 428/119, 98
See application file for complete search history.

(56) References Cited

U.S. PATENT DOCUMENTS

| | | | |
|---|---|---|---|
| 2002/0095830 A1* | 7/2002 | Lage et al. ....................... | 40/324 |
| 2009/0031587 A1* | 2/2009 | Rusnak ........................... | 36/112 |
| 2009/0295023 A1 | 12/2009 | Nagashima | |
| 2010/0327491 A1 | 12/2010 | Nagashima | |

FOREIGN PATENT DOCUMENTS

| | | |
|---|---|---|
| JP | 2004-338154 | 12/2004 |
| JP | 2005-135737 | 5/2005 |

OTHER PUBLICATIONS

European Search Report for corresponding European Application No. 13192999.4, mailed Jan. 9, 2014.

* cited by examiner

*Primary Examiner* — Brent O'Hern
(74) *Attorney, Agent, or Firm* — Jason H. Vick; Sheridan Ross, PC

(57) ABSTRACT

There is disclosed an injection mold which may allow for a uniform flow front of the thermo-plastic melt during the injection mold process. Further, a corresponding injection-molded part is disclosed.

19 Claims, 4 Drawing Sheets

INJECTION MOLD AND INJECTION-MOLDED PART

CROSSREFERENCES TO RELATED APPLICATIONS

This application claims priority of the German utility model 20 2012 104 499.4, filed on Nov. 20, 2012 and of German patent application 10 2013 107 468.5, filed on Jul. 15, 2013. Both priority applications are fully incorporated by reference herewith.

BACKGROUND OF THE INVENTION

Injection-molded parts are known in a great variety of shapes. For certain injection-molded parts, in particular in the area of household goods or entertainment electronics, there are high demands regarding the visual appearance of the injection-molded part as perceived by the user. In particular, it is desired that a visible part of the injection-molded part, i.e. that part of the injection-molded part which is visible to the user and which may be touched by the user, is provided homogenously and uniformly.

If materials with colored particles or pigments are used today, for example colored granulate for obtaining a silver color, the results are not satisfactory today. It is rather required to produce an injection-molded part from raw granulate and paint it with the desired color then. This leads to a complicated and expensive manufacturing process. In addition, the painting typically uncovers tensions in the material which have been locked in the material during the injection mold process. The result is that the painted visible side is visibly inhomogeneous and that the pointed injection-molded part is not suitable for a further use.

It is an object of the present invention to provide an improved injection mold and an improved injection-molded part which may allow to overcome this disadvantage.

SUMMARY OF THE INVENTION

According to a first aspect there is provided an injection mold for producing an injection-molded part, in particular for producing an operating button of a household device, wherein the injection mold comprises a first cavity for a first section of the injection-molded part, a second cavity for a second section of the injection-molded part and an opening for injecting a plastic material, wherein the first and the second cavity are connected fluidwise along a line-shaped connecting section, wherein the first section is a visible part of the injection-molded part and the second section is a side part of the injection-molded part, wherein the first section extends at least substantially in a first plane, the second section extends at least substantially in a second plane and the first and second planes are at an angle to one another, wherein the opening feeds into the second cavity, wherein the second cavity comprises a deepening which depth extends at least substantially perpendicular to the second plane and wherein the deepening increases in width when considering a central line which points from the opening to a closest point on the connecting section.

Such injection mold may allow to injection-mold injection-molded parts using a colored granulate. A painting process can thus be avoided. It is believed to be advantageous if the opening or the injection point is placed such that the injection direction is at an angle relative to the subsequently extending flow front of the thermo-plastic melt. The angle between the injection direction and the central line is preferably between 30° and 150°, more preferably between 60° and 120° and in particular between 80° and 100°. An advantageous and in particular simple to realize embodiment is provided when the angle between the injection direction and the central line is at least approximately 90°.

One of the aspects is to design the geometry of the injection mold such that along the central line or the flow path the flow pressure is steadily reduced in order to ultimately achieve a homogenous flow front across the width of the first section or the surface of the button. In a preferred embodiment this is achieved by providing the area between the opening or the injection point and the beginning of the first section beginning with the connecting section, in particular the beginning of the surface of the button, with a nozzle-like geometry. In other words, initially there is a small cross-section which increases with the advancing flow front to the connecting section, in particular there is a continuous widening, until the flow front has a significant portion of the width of the second section at the connecting section, in particular has the width of the surface of the button.

Should, nevertheless, very minor inhomogeneities of the surface result or in case a dull finish of the surface is desired, the first cavity of the injection mold is preferably provided with a fine surface structure, i.e. the design surface, in order to hide inhomogeneities and/or to provide the dull finish of the surface. The angle between the first and second planes is preferably between 30° and 150°, more preferably between 60° and 120°, in particular between 90° and 100°. The injection mold can be advantageously realized if the angle is at least approximately 90°.

The injection mold is suitable for producing small injection-molded parts. It is also suitable for producing a large injection-molded part, wherein the term "large" refers to those injection-molded parts which cannot be considered "small" anymore.

Each of the previously referenced planes and the planes referenced in the following can be understood as a plane which extends in two directions of a Cartesian coordinate system. The planes can also be understood as planes which are—in reference to a Cartesian coordinate system—curved and which can in particular be described as a plane in an ellipsoid coordinate system, a spherical coordinate system, a spatial polar coordinate system or a cylindrical coordinate system.

The term line-shaped can be understood as linear along a straight line. The term line-shaped can also be understood as linear along a non-straight line, in particular as curved or swinging.

According to an refinement, the width of the deepening in the area of the opening is between 5% and 45%, preferably between 8% and 35%, more preferably between 12% and 32% and in particular between 15% and 25% of the width of the second area at the connecting section.

This refinement may allow for a particularly uniform flow front.

According to a further refinement the width of the deepening at the connecting area is at least 45%, preferably at least 65%, more preferably at least 85% and in particular at least 95% of the width of the second area at the connecting section.

This refinement may allow for a particularly uniform flow front.

According to a further refinement the width of the deepening, considering a view along the central line, increases to a smaller degree in a first area of the deepening closer to the opening than in a second area of the deepening which lies further away from the opening than the first area.

This refinement may allow for a particularly uniform flow front.

According to a further refinement the depth of the deepening increases with increasing distance from the central line, in particular at least substantially continuously and at least substantially over the respective width of the deepening.

This refinement may allow for a particularly uniform flow front, because, among other effects, the increased flow resistance may be compensated for those areas which are located further away from the central line.

According to a further refinement the deepening is arranged facing the opening when viewed in the injection direction.

This refinement may allow for a particularly uniform flow front.

According to a further refinement, there is no direct fluidwise connection between the opening and the first cavity, but only via the second cavity.

In this refinement, the flow front is obtained starting from the opening in the second cavity and only reaches the first cavity thereafter. This may result in a particularly homogenous flow front through the first cavity.

According to a further refinement the injection-molded part does not exceed in any dimension a length of 10 cm, preferably 7 cm, more preferably 5 cm and in particular 4 cm.

For injection-molded parts of this size the flow front becomes very uniform.

According to a further refinement the injection-molded part does not fall in any dimension below a length of 2 mm, preferably 3 mm, more preferably 5 mm and in particular 10 mm.

For injected-molded parts of this size the flow front becomes very uniform.

According to a further refinement the height of the first cavity which extends at least substantially perpendicular to the first plane, increases along a virtual continuation of the central line beyond the connecting section and into the first cavity.

This refinement may allow for more complex designs of the injection-molded parts.

According to a further refinement a third cavity for a third section of the injection-molded part, the third cavity spaced apart from and facing the second cavity, wherein the first and third cavity are connected fluidwise, wherein the third section is a further side part of the injection-molded part, the third section extending at least substantially in a third plane and wherein the first and third planes are at an angle relative to one another.

This refinement may be advantageous for producing control buttons. The further angle is preferably between 30° and 150°, more preferably between 60° and 120° and in particular between 80° and 100°. A particularly advantageous and simple refinement may be obtained if the further angle is at least approximately at 90°.

According to a second aspect there is provided an injection-molded part which has been produced using the injection mold described above.

According to a third aspect there is provided an injection-molded part, in particular an operating button of a household device, the injection-molded part comprising a first section, which is a visible part of the injection-molded part, a second section which is a side part of the injection-molded part, and at least a partial imprint of an injection site of an opening of an injection mold, wherein the first and the second section are connected as one integral piece at least along a line-shaped connecting section, wherein the first section extends at least substantially in a first plane, the second section extends at least substantially in a second plane and the first and second planes are at an angle to each other, wherein the imprint is arranged at the second section, wherein the second section comprises a heightening which height extends at least substantially perpendicular to the second plane and wherein the heightening increases in width when considering a central line which points from the imprint to a closest point on the connecting section.

According to a further refinement the width of the heightening in the area of the imprint is between 5% and 45%, preferably between 8% and 38%, more preferably between 12% and 32% and in particular between 15% and 25% of the width of the second section at the connecting section.

According to a further refinement the width of the heightening at the connecting section is at least 45%, preferably at least 65%, more preferably at least 85% and in particular at least 95% of the width of the second section at the connecting section.

According to a further refinement the width of the heightening, considering a view along the central line, increases to a smaller degree in a first area of the heightening closer to the imprint that in a second area of the heightening which lies further away from the imprint than the first area.

According to a further preferred refinement, the height of the heightening increases with increasing distance from the central line, in particular at least substantially continuously and at least substantially over the respective width of the heightening.

According to a further refinement the heightening is arranged at a first side of the second section facing the imprint when viewed in the injection direction.

According to a further refinement the injection-molded part does not exceed in any dimension a length of 10 cm, preferably 7 cm, more preferably 5 cm and in particular 4 cm.

According to a further refinement the injection-molded part does not fall in any dimension below a length of 2 mm, preferably 3 mm, more preferably 5 mm and in particular 10 mm.

According to a further refinement the height of the first section which extends at least substantially perpendicular to the first plane, increases along a virtual continuation of the central line beyond the connecting section and into the first section.

According to a further refinement a third section is spaced apart from and facing the second section, wherein the third section is a further side part of the injection-molded part, the third section extending at least substantially in a third plane and wherein the first and third planes are at an angle relative to one another.

BRIEF DESCRIPTION OF THE DRAWINGS

It is to be understood that the previously mentioned features and the features mentioned in the following may not only be used in a certain combination, but also in other combinations or as isolated features without leaving the spirit and scope of the present invention.

Preferred embodiments are shown in the drawings and will be explained in more detail in the following. The drawings show.

DESCRIPTION OF PREFERRED EMBODIMENTS

Figure 1:
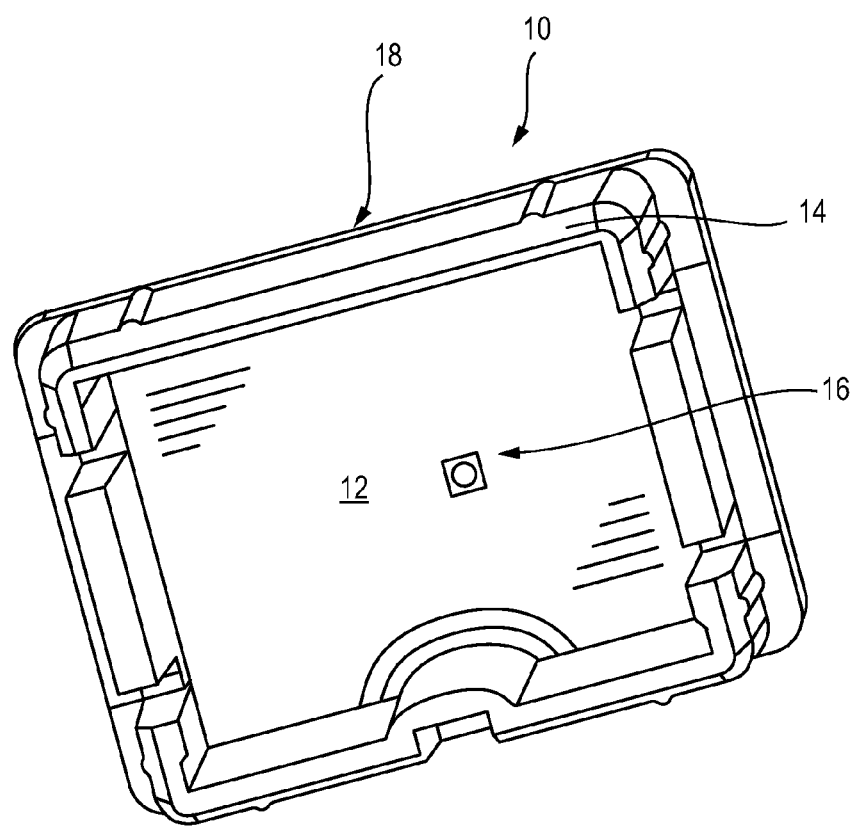
FIG. 1 an injection-molded part according to the prior art.
Figure 1:

FIG. 1 shows an injection-molded part 10 according to the prior art. The injection-molded part 10 comprises a first section 12 which is a visible part of the injection-molded part 10. The injection-molded part 10 further comprises a second section 14 which is a side par of the injection-molded part 10. Further there is shown symbolically an imprint 16 of an injection point of an opening of an injection mold (not shown).

The first and second sections 12, 14 are connected as one integral piece at least along a line-shaped connecting section 18.

The first section 12 extends at least substantially in a first plane XY, here, the XY-plane, and the second section 14 extends at least substantially in a second plane XZ, here, the XZ-plane. The first and second planes XY, XZ are at an angle relative to one another which is at least approximately 90°.

Figure 2:
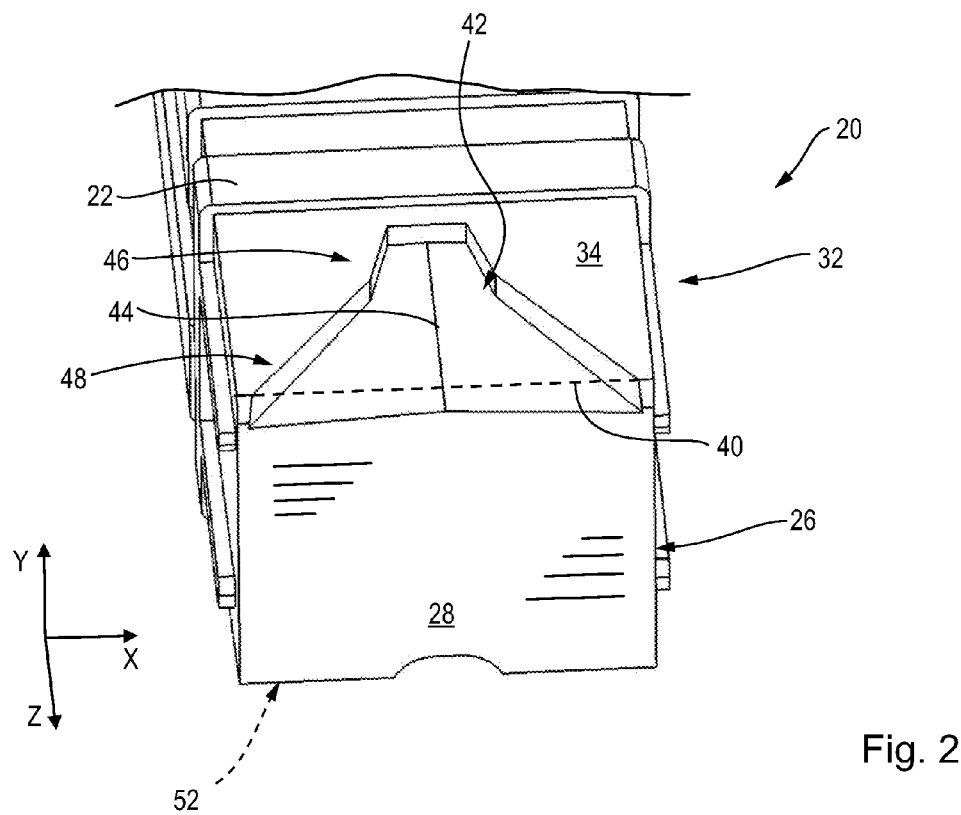
FIG. 2 a first element of an embodiment of an injection mold according to the present invention.
Figure 3:
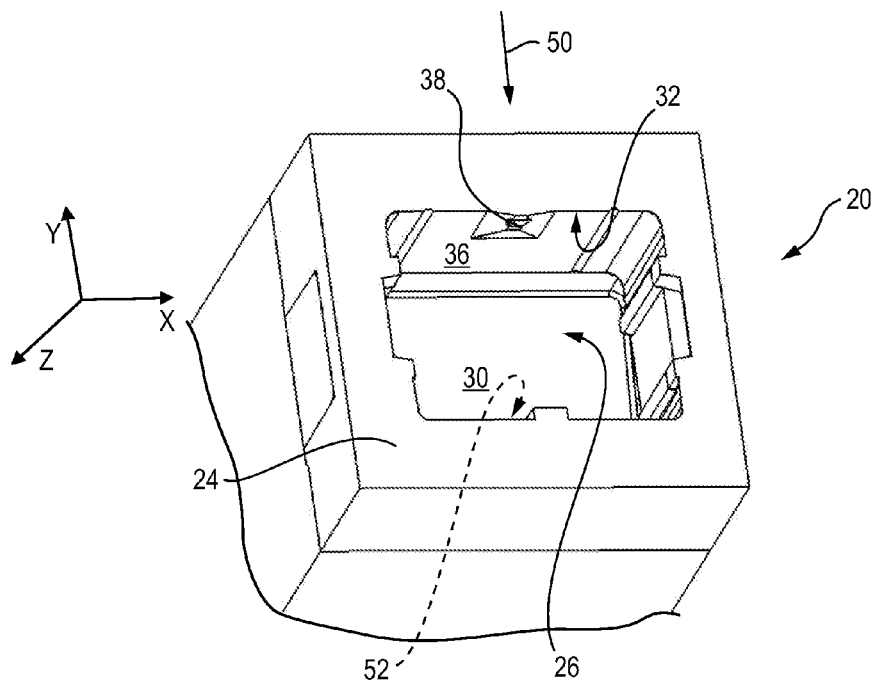
FIG. 3 a second element of an embodiment of an injection mold according to the present invention.

According to a preferred embodiment shown in FIGS. 2 and 3, the injection mold 20 for producing a small injection-molded part 10 consists of a first element 22 (see FIG. 2) and a second element 24 (see FIG. 3). The injection mold 20 will now be explained based on these figures.

The injection mold 20 comprises a first cavity 26 for a first section 12 of the injection-molded part 10. The cavity 26 is provided by keeping a distance between the termination surface 28 of the first element 22 and the floor 30 of the second element 24, if the first element 22 is inserted into the second element 24. Then, when the first element 22 is inserted into the second element 24, a liquid material is injected and fills the cavities to produce an injection-molded part The injection mold 20 further comprises a second cavity 32, which results from a distance between the side termination surface 34 of the first element 22 and the side wall 36 of the second element 24.

Further, an opening 38 for injecting a plastic material or a thermo-plastic melt is shown. The first and second cavities 26, 32 are connected at least along a line-shaped connecting section 18 symbolized by a dashed line 40.

The first section 12 is a visible part of the injection-molded part 10, and the second section 14 is a side part of the injection-molded part 10. The first section 12 or the first cavity 26 extend at least substantially in a first plane XY, here, the XY-plane, and the second section 14 or the second cavity 32 extend at least substantially in a second plane XZ, here, the XZ-plane. The first and second planes XY, XZ are at an angle relative to each other.

The opening 38 feeds into the second cavity 32. The second cavity 32 further comprises a deepening 42, its depth, here in the Y-direction, is at least approximately perpendicular to the second plane XZ. The deepening 42 increases in width, here in the X-direction, when considering moving along the central line 44. The central line 44 is formed starting from the opening 38 and pointing to a closest point on the connecting section 18.

The width of the deepening 42 increases, when considering moving along the central line 44, in a first area 46 of the deepening 42 close to the opening 38 to a lesser degree than in a second area 48 of the deepening 42 which is located further away from the opening 38 than the first area 46.

The depth of the deepening 42 increases with increasing distance from the central line 44, in particular substantially continuously and substantially across the corresponding width of the deepening 42. The deepening 42 is arranged facing the opening 38 when viewed in the injection direction 50, however, as shown, without being limited to this area.

A third cavity is spaced apart from and facing the second cavity 32 in order to obtain a third section 54 of the injection-molded part 10. The first and second cavities are connected fluidwise, wherein the third section 54 is a further side part 56 (see FIG. 4) of the injection-molded part 10. The third section 54 extends at least substantially in a third plane XZ', here, the XZ-plane, and the first and third planes XY, XZ' are at an angle relative to one another.

Figure 4:
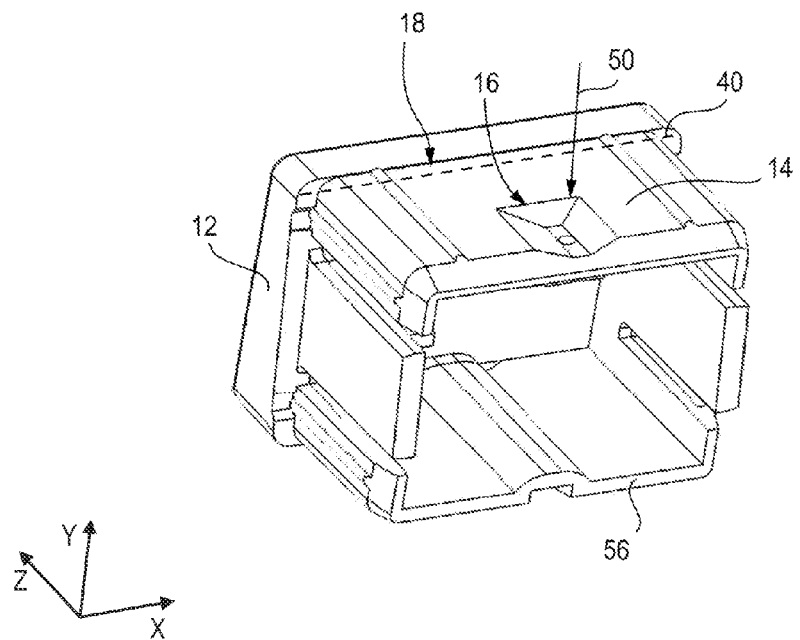
FIG. 4 a first embodiment of an injection-molded part according to the present invention in a first view.

FIG. 4 shows a first embodiment of an injection-molded part 10, here an operating button of a household device. The injection-molded part 10 comprises a first section 12, which is a visible part of the injection-molded part 10, a second section 14, which is a side part of the injection-molded part 10, and at least a partial imprint 16 of an injection point of an opening 38 of an injection mold 20.

The first and second sections 12, 14 are integrally connected as one piece along at least a line-shaped connecting section 18 which is further shown by dashed line 40. The first section 12 extends at least substantially in a first plane XY, here, the XY-plane, the second section 14 extends at least substantially in a second plane XZ, here, the XZ-plane, and the first and second planes XY, XZ are at an angle relative to each other.

The imprint 16 is present on the second section 14. The second section 14 comprises a heightening 58 (see FIG. 5) which width extends at least approximately perpendicular to the second plane XZ. The heightening 58 increases in width when considering moving along the central line 44, wherein also for this embodiment the central line 44 starts from the imprint 16 and points to a closest point on the connecting section.

Figure 5:
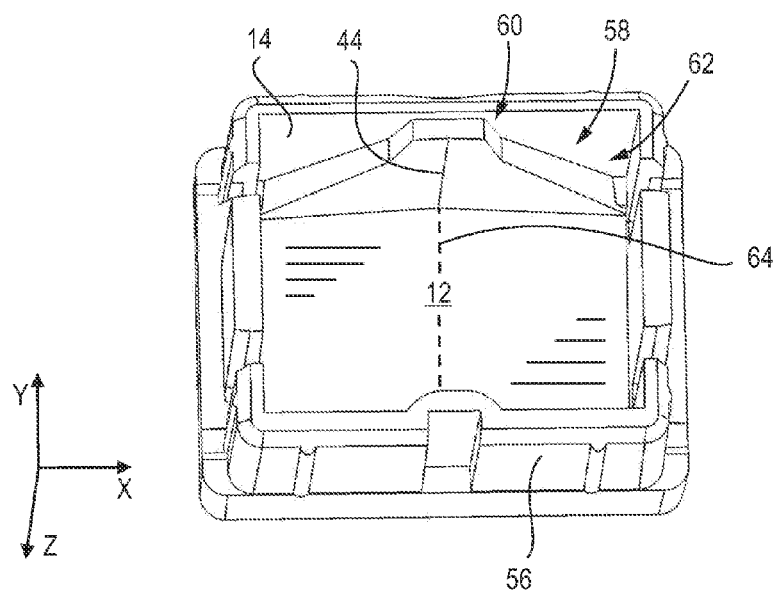
FIG. 5 the injection-molded part according to FIG. 4 in a second view.

FIG. 5 shows that the width of the heightening 58 when considering moving along the central line 44 increases to a smaller degree in a first area 60 of the heightening 58 close to the imprint 16 than in a second area 62 of the heightening 58 which is located further away from the imprint 16 than the first area 60. It is shown that the height of the heightening 58 increases with increasing distance from the central line 44, in particular substantially continuously and substantially across the whole corresponding width of the heightening 58. The heightening 58 is located at a first side of the second section 14 facing the imprint 16 in the injection direction 50.

The height of the first section 12 which extends at least approximately perpendicular to the first plane XY, increases along a virtual continuation of the central line 44 beyond the connecting section 18 into the first section 12 which is symbolized by the dashed line 64.

A third section 56 is spaced apart from and is facing the second section 14, wherein the third section 56 is a further side part of the injection-molded part 10, the third section 56 extends at least substantially in a third plane XZ', here, the XZ-plane, and the first and third planes XY, XZ' are at angle relative to one another.

As illustrated in FIG. 5, an injection-molded control button is shown comprising a first section 12 having a visible contact surface (not shown) and an interior surface opposite the visible contact surface. The first section 12 extends in a first plane (XY). A sidewall 14 is formed along at least a portion of the interior surface and extending along a second plane (XZ), wherein the second plane (XZ) is disposed at an angle to the first plane (XY). The sidewall 14 includes a first surface and second surface opposite the first surface. The sidewall 14 includes an imprint 16 (shown in FIG. 4) in the first surface, the imprint corresponding to at least a portion of an injection site associated with an injection mold. As shown in FIG. 5, the sidewall 14 includes a ridge 58 formed at the second surface of the sidewall 14, the ridge 58 extends from a first point 60 opposite at least a portion of the imprint 16 to the interior surface of the first section 12. The width of the cross-sectional area of the ridge 57 continuously increases in size from the first point 60 to the interior surface 12.

Figure 6:
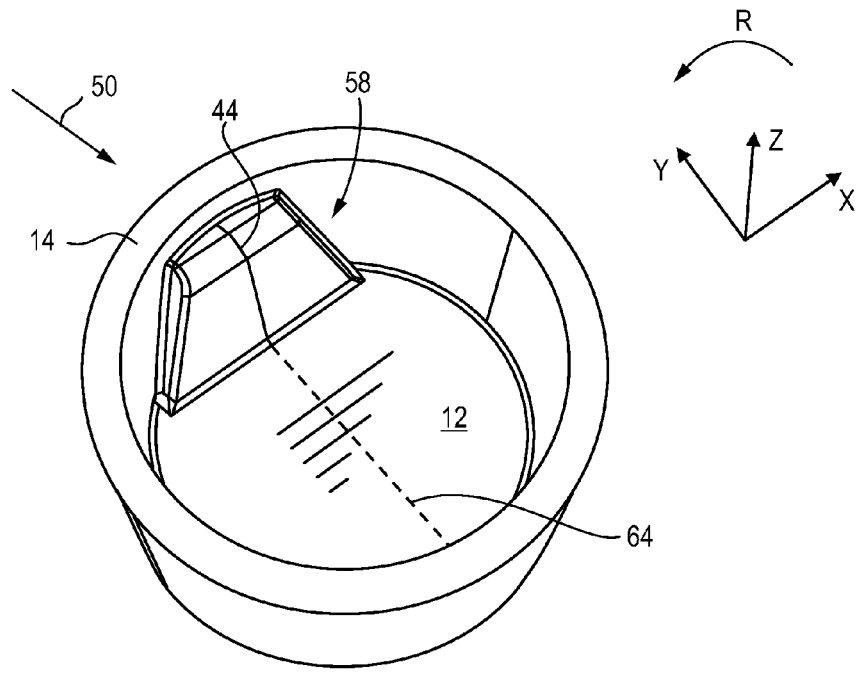
FIG. 6 a second embodiment of an injection-molded part according to the present invention.

FIG. 6 shows a second embodiment of an injection-molded part 10, here, again an operating button of a household device. The injection-molded part 10 comprises a first section 12, which is a visible part of the injection-molded part 10, and a second section 14, which is a side part of the injection-molded part 10.

The first section 12 extends at least substantially in a first plane XY, The first plane XY may be a plane in a Cartesian coordinate system as well as, as has been explained at the beginning, a plane in an another coordinate system, so it may also be curved. The second section 14 extends at least substantially in a second plane RZ. The second plane RZ is spanned by the Z-axis and a curvature R around the Z-axis. The second plane RZ lies in a barrel plane of a circular cylinder. The first and second planes XY, RZ are at an angle relative to one another.

For the further explanations reference is made to FIGS. 4 and 5. The second embodiment of the injection-molded part 10 discloses directly also a corresponding injection mold 20, because the mold is the negative of the injection-molded part 10. Consequently, the deepening 42 of the corresponding injection mold 20 is the negative of the heightening 58 of the injection-molded part 10. The first section 12 of the corresponding injection mold 20 is the negative of the first cavity 26 of the injection-molded part 10. The second section 14 of the corresponding injection mold 20 is the negative of the second cavity 32 of the injection-molded part 10. The imprint of an injection point of an opening of an injection mold 20, see FIG. 4, is hidden.

Figure 7:
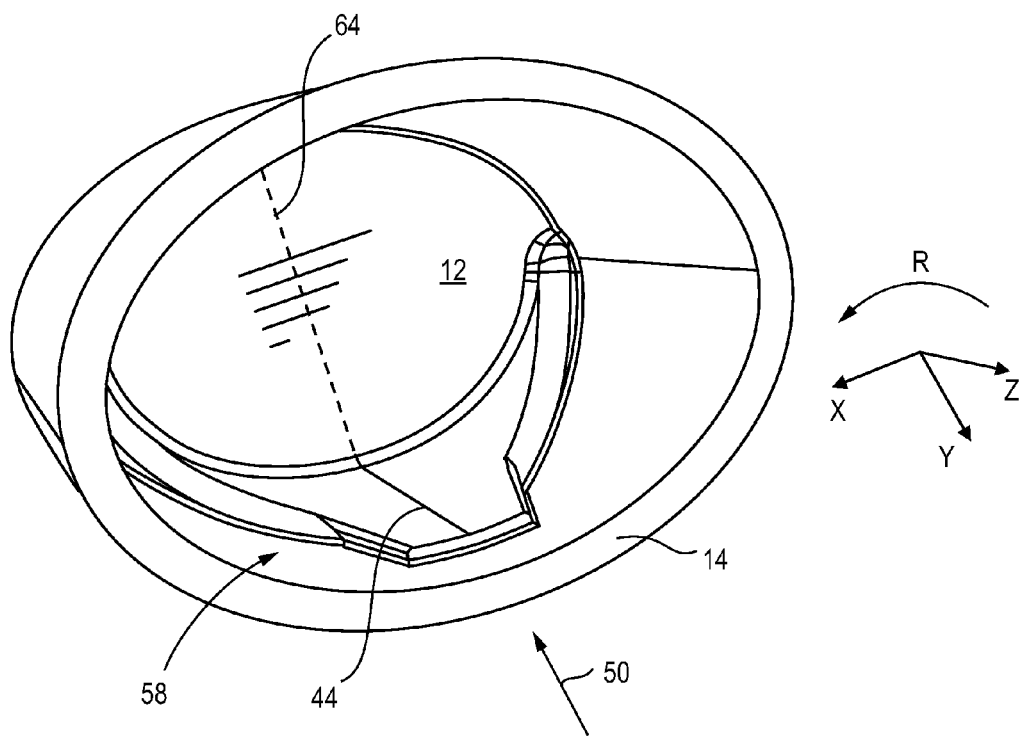
FIG. 7 a third embodiment of an injection-molded part according to the present invention.

FIG. 7 shows a third embodiment of an injection-molded part 10, which differs from the second embodiment in that the plane RZ lies in the barrel plane of a cylinder having an elliptical base area. The other explanations in the context of FIG. 6 apply here as well.

What is claimed is:

1. An injection-molded control button, comprising:
    a first section having a visible surface;
    a second section corresponding to a side part of the injection-molded control button;
    wherein the second section includes an imprint in a first surface of the second section corresponding to at least a portion of an injection site associated with an injection mold;
    wherein the first and the second sections are connected as one integral piece at least along a line-shaped connecting section;
    wherein the first section extends at least substantially in a first plane, the second section extends at least substantially in a second plane and the first and second planes are at an angle to each other;
    wherein the second section includes a raised portion extending from a first point opposite at least a portion of the imprint to a second point at the connection of the first and second section; and
    wherein a width of the raised portion increases in size from the first point to the second point.

2. The injection-molded control button according to claim 1, wherein the width of the raised portion at the first point is between 5% and 45% of the width of the raised portion at the connecting section.

3. The injection-molded control button according to claim 1, wherein the width of the raised portion at the connecting section is at least 45% of a width of the second section at the connecting section.

4. The injection-molded control button according to claim 1, wherein the width of the raised portion gradually increases in size at a first rate from the first point to a third point that is disposed between the first point and the second point, wherein the width of the raised portion gradually increases in size at a greater second rate from the third point to the second point, and wherein the width corresponds to a dimension of the raised portion that is coincident with the first surface of the second section or a second surface of the second section that is opposite the first surface of the second section.

5. The injection-molded control button according to claim 1, wherein a height of the raised portion increases with increasing distance from the first point.

6. The injection-molded control button according to claim 1, wherein the angle of the first plane to the second plane is between 30 and 150 degrees.

7. The injection-molded control button according to claim 1, wherein the injection-molded control button does not exceed in any dimension a length of 10 cm and does not fall in any dimension below a length of 2 mm.

8. The injection-molded control button according to claim 1, wherein a height of the first section which extends at least substantially perpendicular to the first plane, increases along a length of the first section.

9. The injection-molded control button according to claim 1, wherein a third section is spaced apart from and facing the second section, wherein the third section is a further side part of the injection-molded control button, the third section extending at least substantially in a third plane and wherein the first and third planes are at an angle relative to one another.

10. An injection-molded control button, comprising:
    a first section having a visible contact surface and an interior surface opposite the visible contact surface, the first section extending in a first plane;
    a sidewall formed along at least a portion of the interior surface and extending along a second plane, wherein the second plane is disposed at an angle to the first plane;
    wherein the sidewall includes a first surface and second surface opposite the first surface;
    wherein the sidewall includes an imprint in the first surface, the imprint corresponding to at least a portion of an injection site associated with an injection mold;
    wherein the sidewall includes a ridge formed at the second surface, the ridge extending from a first point opposite at least a portion of the imprint to the interior surface of the first section; and
    wherein a width of the ridge continuously increases in size from the first point to the interior surface.

11. The injection-molded control button of claim 10, wherein a cross-sectional area of the ridge includes a first width that runs parallel with the second surface of the sidewall, and wherein the first width continuously increases in dimension from the first point to the interior surface.

12. The injection-molded control button of claim 11, wherein the angle of the second plane to the first plane is between 30 and 150 degrees.

13. The injection-molded control button of claim 12, wherein the cross-sectional area of the ridge includes a height that extends in a direction away from the second surface of the sidewall, and wherein the height continuously increases in dimension from the first point to the interior surface.

14. The injection-molded control button of claim 12, wherein the cross-sectional area of the ridge includes a second width that is offset from and runs parallel to the first width, and wherein the second width continuously increases in dimension from the first point to the interior surface.

15. The injection-molded control button of claim 10, wherein the sidewall is formed along a periphery of the first section.

16. The injection-molded control button of claim 15, wherein the first section includes an arcuate-shaped periphery.

17. The injection-molded control button of claim 16, wherein the ridge includes a height that extends in a direction away from the second surface of the sidewall and toward a center of the periphery, and wherein the height continuously decreases in dimension from the first point to the interior surface.

18. The injection-molded control button of claim 17, wherein the first section includes an outer periphery that tapers from a first size at a distance offset from the interior surface of the first section to a smaller second size at the interior surface of the first section.

19. The injection-molded control button of claim 18, wherein the second plane is a curved plane disposed at an angle between 30 and 150 degrees to the first plane.

* * * * *